J. J. McGUIRE.
WHEEL HUB.
APPLICATION FILED AUG. 4, 1910.
1,024,270.
Patented Apr. 23, 1912.
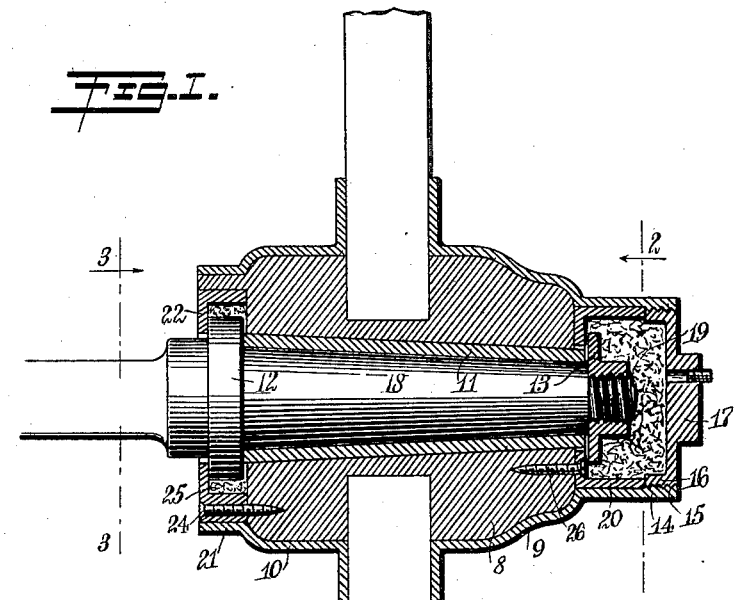
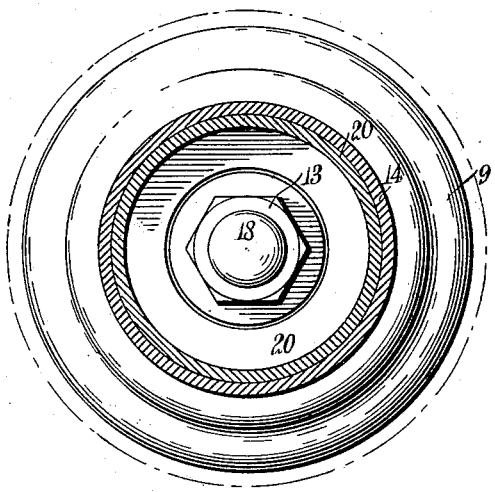
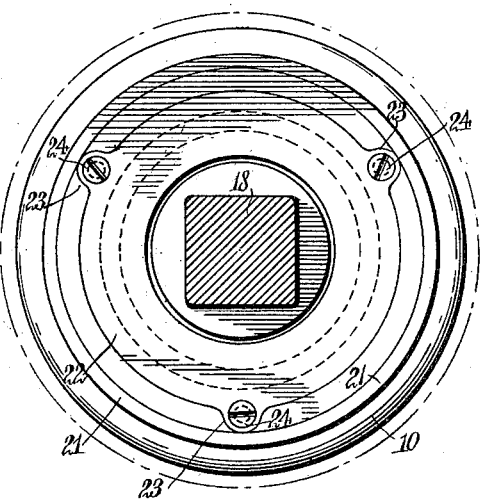
WITNESSES:
G. Robert Thomas
E. T. Murdock
INVENTOR
John J. McGuire
BY
ATTORNEYS

UNITED STATES PATENT OFFICE.

JOHN J. McGUIRE, OF NEW YORK, N. Y.

WHEEL-HUB.

1,024,270.

Specification of Letters Patent.

Patented Apr. 23, 1912.

Application filed August 4, 1910. Serial No. 575,413.

*To all whom it may concern:*

Be it known that I, JOHN J. McGUIRE, a citizen of the United States, and a resident of the city of New York, borough of Manhattan, in the county and State of New York, have invented a new and Improved Wheel-Hub, of which the following is a full, clear, and exact description.

Among the principal objects which the present invention has in view are: to provide dust-proof chambers for supplying oil to the axle journal and to prevent the admission of dust or grit thereto; to provide a reinforcing metal protective shell for the hub and an auxiliary lining for the oil containing receptacle thereof, constructed and arranged to prevent the seepage of oil between said shell and the body of the hub.

One embodiment of the present invention is disclosed in the structure illustrated in the accompanying drawings, in which like characters of reference denote corresponding parts in all the views, and in which—

Figure 1 is a vertical longitudinal section of a hub constructed and arranged in accordance with the present invention; Fig. 2 is a vertical cross section taken on the line 2—2 in Fig. 1; and Fig. 3 is a vertical cross section taken on the line 3—3 in Fig. 1.

When constructed in accordance with the present invention the wooden body or filler 8 is shaped substantially as shown in longitudinal section in the drawings, and is covered at both ends by metal casings 9 and 10. The hub is provided with a journal box 11 secured in the body 8 in the usual manner. The box 11 is elongated to extend slightly beyond the ends of the perforation formed in the body 8 for the same. The end edges of the box 11 form thrust bearings for a collar 12 and a nut 13.

The casing 9 is extended to form a cylindrical box-like portion 14, the outer edge whereof is provided with an internally threaded portion 15. The threads provided on the portion 15 are constructed to receive the threaded flange 16 of a cap nut 17. The extension of the portion 14 is sufficient to form a chamber at the outside of the nut 13 and the screw threaded end of the axle 18. It is within this chamber that the loose packing 19 is placed. The packing 19 is supersaturated with oil or other suitable lubricant. It is to prevent the exudation or seepage of oil from the box formed by the portion 14 between the body or filler 8 and the casing 9, that there is provided a metal lining 20. The lining 20 is provided with a central opening adapted to neatly fit and receive the base flange of the nut 13.

The casing 10 is provided with an extended portion 21, to serve as a collar for the rear of the filler 8. The filler 8 is recessed at the rear to form a box-like receptacle for the collar 12. To dust proof the joint between the collar 12, the box 11 and axle 18, I have provided a cup ring 22. The ring 22 is provided with a series of ear-like projections 23 provided to receive screws 24. The screws 24 when driven through the ears 23 are extended into the filler 8 in holding engagement therewith. The cup ring 22 is provided with suitable loose packing 25, which is saturated with oil to wipe the collar 12 and to prevent the admission of grit or dust therebetween. The packing 25 further serves the purpose of arresting any of the oil which may pass through the bearing formed for the journal 18 by the box 11, thus preventing the unsightly and disagreeable oil stains and coagulations on the rear of the hub. It will be understood that the ring 22 is placed in position after the wheel having the hub thus constructed is mounted in position.

During the employment of a hub thus constructed and arranged, the oiling of the axle 18 is performed by removing the cap nut 17 and supersaturating the packing 19 contained in the portion 14.

The lining 20 I prefer to secure in position by screws 26, as shown in Fig. 1 of the drawings.

Having thus described my invention, what I claim as new and desire to secure by Letters Patent is:—

1. A wheel hub, comprising a metal hub casing having an externally projected box-like end portion, said portion having formed adjacent the outer edge thereof an internal screw thread; a cap for said box-like portion provided with a peripheral screw thread to engage the screw thread in said box-like portion, and a box-like lining having cylindrical and radial flanges, the former constructed to form a seat for said cap and the latter to form a seat for the holding nut of said hub, said lining being removable from said hub.

2. In a wheel hub, an oil box having provided adjacent the open end thereof a screw thread; a lining for said box having cylindrical side walls and a bottom portion, said bottom portion being perforated to extend about the axle within said box and to rest under the holding nut of said axle; and a screw threaded closure cap for said box threaded to engage the screw threads of said box and to seat on the outer edge of said lining.

In testimony whereof I have signed this specification in the presence of two subscribing witnesses.

JOHN J. McGUIRE.

Witnesses:
E. F. MURDOCK,
PHILIP D. ROLLHAUS.

Copies of this patent may be obtained for five cents each, by addressing the "Commissioner of Patents, Washington, D. C."